April 16, 1957     W. D. WEST ET AL     2,788,723
PHOTOGRAPHIC CAMERAS
Filed Oct. 11, 1954     3 Sheets-Sheet 1
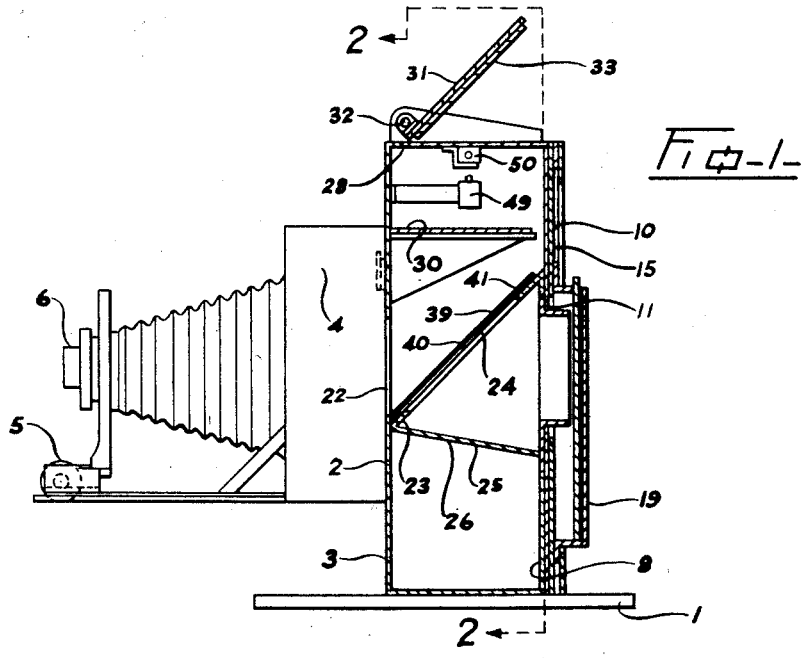
*Fig-1-*
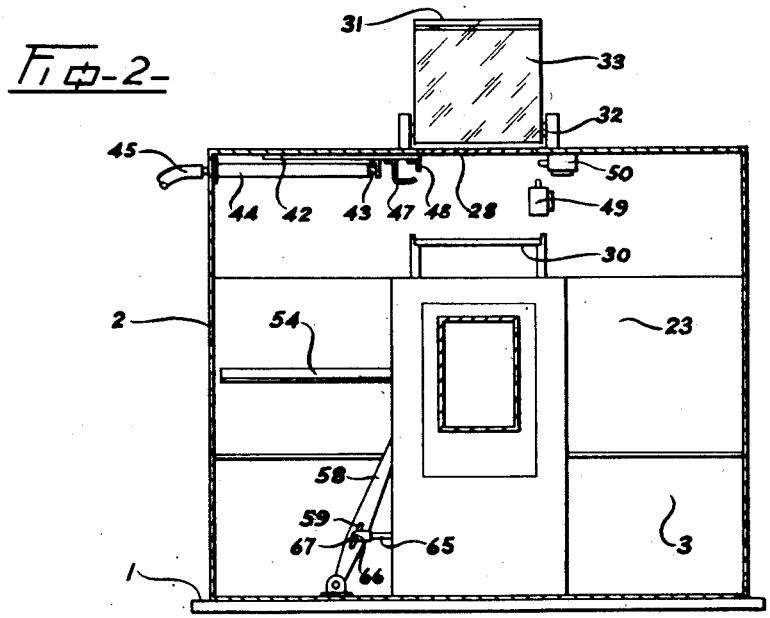
*Fig-2-*
INVENTORS
WALTER D. WEST
RAE KARNEY
ATTORNEY

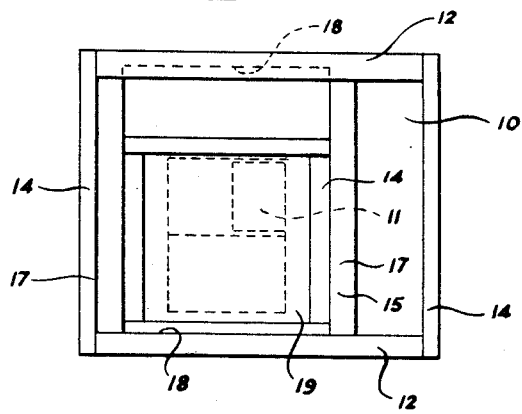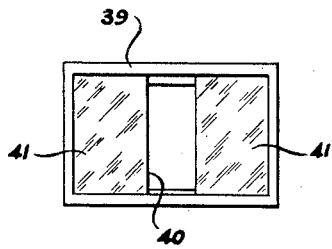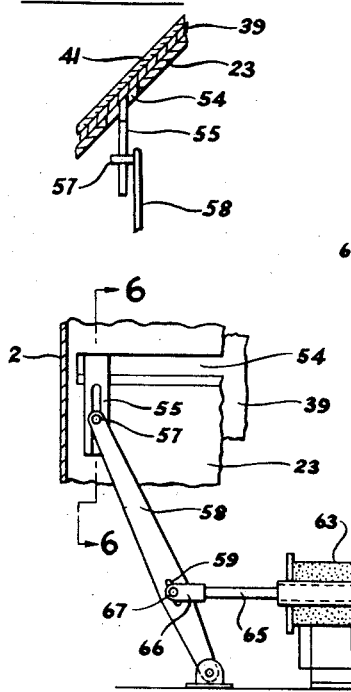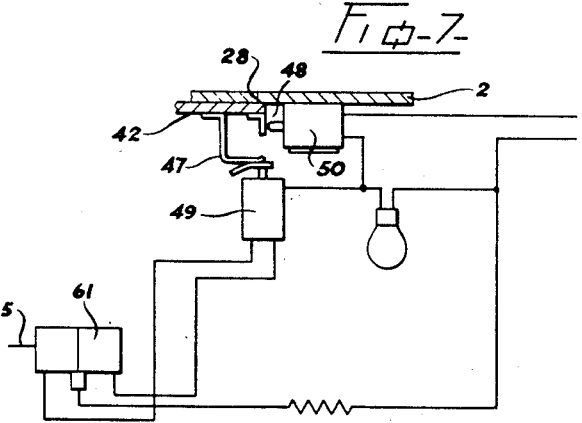

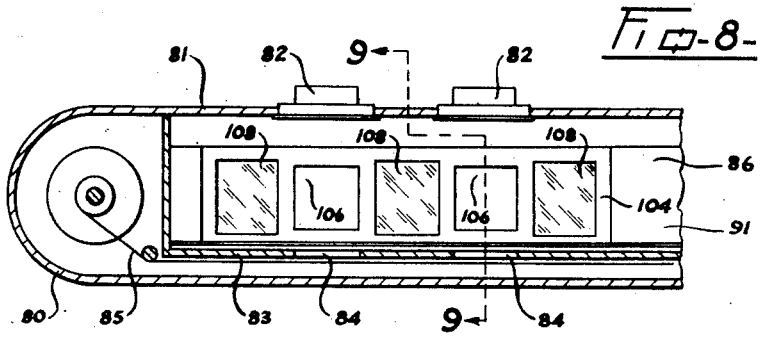
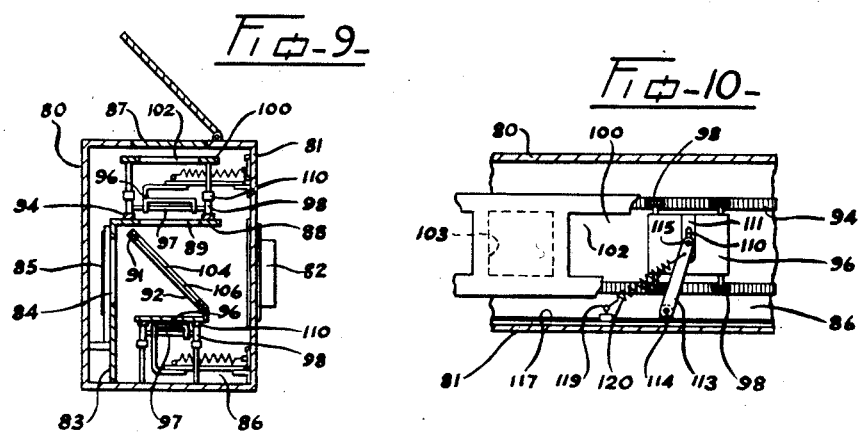
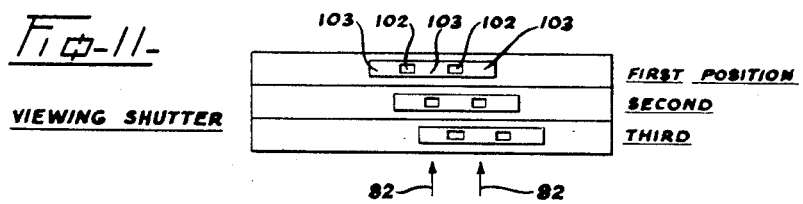
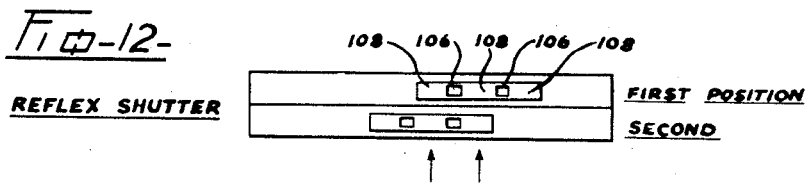

United States Patent Office 2,788,723
Patented Apr. 16, 1957

2,788,723

PHOTOGRAPHIC CAMERAS

Walter D. West, Prince George, British Columbia, and Rae Karney, Quensel, British Columbia, Canada Application October 11, 1954, Serial No. 461,304

6 Claims. (Cl. 95—18)

Our invention relates to improvements in photographic cameras.

The objects of the invention are to provide a camera which may conveniently be used for studio work, whereby the photographer may watch his subject and his reflex focusing screen right up to the moment that he operates his shutter, and to provide a shutter for the focusing screen and an inclined shutter for the film which are adapted for substantially simultaneous operation, the film shutter serving to carry the reflex mirror and to be set in motion to traverse the film at the instant that complete closure of the focusing screen is accomplished. A further object is to provide a shutter focusing and film slide carrying device to which an ordinary plate film camera, minus its slide carrying back, may be attached, whereby a number of exposures of the normal full size of the attached camera may be made, so that all exposures can be developed as one negative and similarly whereby all exposures can be printed on a single sheet to be divided later. Such multiple exposures on a single negative and such similar printing of multiple frames on a single sheet result in much economy in film and paper and solutions and also in the time of processing.

These and other objects will appear as the specification proceeds.

Referring to the accompanying drawings:

Figure 1 is a side sectional view of the invention shown part in elevation.

Figure 2 is a sectional elevation taken on the line 2—2 of Figure 1.

Figure 3 is a plan view of the reflex slide or shutter.

Figure 4 is an elevational view of the back plate showing the horizontal and vertical sliding back.

Figure 5 is a detail sectional view of the means for moving the reflex slide to expose a film.

Figure 6 is a sectional detail view taken on the line 6—6 of Figure 5.

Figure 7 is a wiring diagram.

Figure 8 is a sectional plan view of the shutter assembly arranged for use in a stereoscopic camera.

Figure 9 is a transverse sectional view taken on the line 9—9 of Figure 8.

Figure 10 is a detail view of a shutter mechanism for operating each of the shutters.

Figure 11 is a diagram showing the sequence of positions of the viewing screen for focusing.

Figure 12 is a diagram showing the sequence of positions for the film screen before and after exposure.

In the drawings like characters of reference indicate corresponding parts in each figure.

The numeral 1 indicates the table of a tripod or other camera support and detachably mounted thereon is a reflex shutter housing 2 having a front panel 3 on the face of which a camera body 4 is secured.

The camera body 4 may be detachably connected to the front panel 3, or may be an integral part of the entire unit shown and said camera body does not include the normal focusing and slide carrying back, but may include a focusing media 5, which as here shown, is the usual rack and pinion device, and also a lens 6 together with the usual diaphragm, not shown.

The height and width of the housing 2 is such that its back frame 8 can carry a demountable back 10 covering the entire rear of the housing and having therein a single rectangular opening 11 of the size of the normal focusing screen area for the lens used. This back panel is provided with horizontal side rail 12 and vertical stops 14, see Figure 4, in which a subsidiary frame 15 is mounted for horizontal movement. The subsidiary centrally apertured frame 15 is provided with vertical guide rails 17 and horizontal stops 18 in which a conventional focusing screen and slide holder is slidably mounted for vertical movement. The slide holder may be of an area equal to say four times that of the rectangular opening 11, so that a film of that size can be selectively positioned relative to the said opening that four separate exposures can be made on said film. The front panel 3 of the housing is provided with a suitable opening 22 to allow light from the lens to reach the film to be exposed and extending transversely of the housing is a light tight wall 23 which is inclined at an angle of forty-five degrees from the horizontal and which is provided with a central opening 24 at least as great as the opening 11 and a tunnel 25 having top, side and bottom walls 26 extending through the opening 11. The wall 23 and the tunnel 25 block the passage of light between the lower part of the housing 1 and the camera body 5.

A viewing opening 28 is formed in the top wall of the housing, which is preferably glazed with clear glass, and directly below this and at the same distance from the wall 23 as the film would be from the lens is a horizontal focusing screen 30. A flap 31 is mounted at a forward edge of the viewing opening on hinges 32 and is adapted to open to substantially forty-five degrees. The flap is provided with a mirror 33 which, when raised as shown in Figure 1, will show to the photographer standing behind the housing the picture framed in the viewing opening and on the focusing screen 30.

Slidably mounted upon the wall 23 is a reflex shutter 39 which is provided with a rectangular opening 40 intermediate its length, which is of the same dimension as the opening 24. The shutter extends an equal distance on opposite sides of the opening 39 and is provided on each end piece with a reflex mirror 41, either of which is normally placed directly below the horizontal focusing screen 30 and covering the opening 24 of the wall 23. Slidably mounted below the top cover of the housing 1 is a horizontal shutter 42 which is adapted to close the viewing opening 28. The shutter is connected to the piston rod 43 of an air cylinder 44 and said cylinder is coupled in the usual manner with a rubber tube 45 having a collapsible bulb, not shown, at its free end. The shutter 42 is adapted to be withdrawn to normal open position by any suitable means, not shown. Attached to the shutter 42 are two triggers 47 and 48, which are adapted to actuate respectively two switches 49 and 50, see detail in Figure 5, these triggers are so disposed that as the shutter is moving to its closed position, switch 49 will be actuated and when the shutter fully covers the opening 28 the switch 50 will be actuated, as will be hereinafter described.

The wall 23 is provided with an elongated slot 54 and a bracket 55 extends downwardly therethrough which is secured to the back of the reflex shutter 39. The bracket 55 forms a slide in which the crank pin 57 of a lever 58 has sliding movement. The lever 58 is fulcrumed in the base of the housing and is provided with a slot 59 intermediate its length. The lever 58 is moved in either direction by a solenoid 61 having a right hand coil 62 and a left hand coil 63. The armature 64 of the solenoid is fitted with a push-pull rod 65 having a fork 66 at its outer end which is connected to the lever by a pin 67 which passes through the slot 59.

In the diagram of Figure 7 the horizontal shutter 42 is at the point of closing. The switch 49 is a normally closed reversing switch which on having its button depressed reverses the current flow from the line from one coil of the solenoid 61 to the other and is actuated just at the point of closing of the shutter 42 and is released as the shutter returns. The switch 50 is a normally open spring loaded push button type which is in series with the switch 49 and also controls a flash bulb used during the exposure of the camera. This switch is actuated during the final closing movement of the shutter, thus causing the bulb to flash and the solenoid to move the reflex shutter 39 to move across the opening 24, with its opening 40 passing into and out of register therewith to expose that frame of the film which is in register with the rear of the tunnel 25. The above movement will move one mirror 41 from under the viewing opening and put the other in register therewith. When the shutter 42 returns to normal position, the focusing screen 30 will again be available for use in viewing the subject to be next photographed.

Should it be necessary to make two or more pictures of a group in rapid succession, the photographer, when moving his film slide to another position to expose another frame, can watch for any movement of one of his subjects in the mirror 33 which may require refocusing before the next exposure is made.

It will be clearly understood that the switch triggers 47 and 48 described as mounted on the manually operated horizontal shutter 42 may be attached to the hinged flap 31 over the viewing opening 28 and whereby the closing down of said flap 31 will cause the triggers to actuate the switches 49 and 50 to initiate the actuation of the reflex shutter 39, thereby dispensing with the need for the manually operated shutter 42.

The numeral 80 indicates the rear and end walls of a stereoscopic camera and 81 indicates its front wall in which a pair of lenses 82 are mounted. A vertical wall 83 having film frame apertures 84 is provided in front of the rear wall 80 along which a photographic film 85 is adapted to be moved. The camera body 86 which is defined between the vertical wall 83 and the front wall 81 is provided with a horizontal viewing screen 87 and a horizontal wall 88 having rectangular openings 89 conforming to the film frame apertures 84. An inclined wall 91 having two rectangular openings 92 conforming in size and spacing to those of the vertical wall 83 extends lengthwise of the camera body. Suitably supported from each of the horizontal and the inclined walls 88 and 91 is a pair of toothed racks 94. A carriage 96 is provided to move endwise of each wall 88 and 91 and said carriage is fitted with a pair of axles 97 having pinions 98 which engage the racks. A viewing shutter 100 having openings 102 and closure portions 103 is slidably mounted parallel to the wall 88 and a reflex shutter 104 is mounted parallel to the wall 91. The reflex shutter has two openings 106 spaced to conform to the lens spacing and three reflex mirrored areas 108. The viewing and reflex shutters may be operated by any suitable means, which will obviously be varied according to the disposition of the usual accessories such as range finders, exposure meters and the like fitted to cameras of different make.

The preferred manual means of operating the shutters 100 and 104 will require that each be provided with a pair of toothed racks 110, which would run on the pinions 98, so that as a carriage 96 moves along its racks 94 a given distance, the shutter connected with said carriage will move exactly twice that given distance. Each carriage is provided with an arm 111 having a slot 112. A crank 113 is pivotally mounted on a pin 114 affixed to a stationary part and is provided with a crank pin 115 which enters the slot. A sliding member 117 is mounted for movement parallel to the shutter and close to the pin 114 and is provided with an eyelet 119 which forms a movable anchorage for one end of a tension spring 120 connected to the crank 113 adjacent its free end. The sliding member 117 is adapted to dispose the spring 120 selectively to two positions to urge the crank 113 and move the carriage to which it is connected in either direction. The sliding member 117 would be manually operated by a suitable button or knob, not shown, on the outside of the camera.

The moving mechanism of both shutters 100 and 104 would be coupled by any suitable means, so that one manual adjustment would cause both shutters to move in their appointed direction and order and suitable means would be provided whereby the final movement of the viewing shutter in either direction would release the reflex shutter to move through its exposure cycle.

Assuming that the viewing shutter 100 had come to rest as in position 1 of Figure 11 and the reflex shutter 104 had come to rest, as shown in position 1 of Figure 12, the shutter setting means would be set to move the viewing shutter to the right and the reflex shutter to the left. The initial release of the viewing shutter would allow it to move to a suitable stop provided, but not shown, and come to rest in position 2 of Figure 11. This would leave the reflex shutter still in position 1 of Figure 12 with two of its mirror areas 108 in position to reflect the images through the lenses 82 to the viewing screen 87. When the viewing shutter is released again or from position 2 of Figure 11, it closes to the right as in position 3 and completes one complete stroke of its movement. Simultaneously with the above closing movement the reflex screen moves in a single stroke from right to left of Figure 12, thus uncovering the openings 92, allowing the film frames to be exposed and come to rest as in position 2 of Figure 12, with the openings again covered. The shutter mechanism again being set the movements above described will be exactly reversed bringing the shutters back to the position shown in Figures 11 and 12.

What we claim as our invention:

1. A reflex focusing screen and shutter combination for a camera body comprising a housing having a transversely extending dividing wall, said wall having a central opening, a vertical apertured rear panel for supporting a film holder, a tunnel between the opening of the dividing wall and the aperture of the rear wall to form a light passage from the camera lens to a film in the film holder, a horizontal focusing screen in the housing above said opening, said housing having a top viewing opening above the screen, a manually operated shutter to close the viewing opening, a reflex shutter slidable upon the dividing wall having a central opening and a mirror on opposite sides of said opening, said central opening and one of the mirrors being adapted to traverse the central opening of the dividing wall with one of said mirrors coming to rest to normally cover said opening, and means for initiating the movement of the reflex shutter as the manually operated shutter is moved to close the top viewing opening, said reflex shutter being moved by electrical means, said electrical means being within a circuit and a switch means within said circuit adapted to close said circuit as the viewing opening is closed, said electrical means being a push-pull solenoid, and said circuit having in series with the circuit closing switch a reversing switch for selectively operating the solenoid to push or pull.

2. A reflex focusing screen and shutter combination for a camera body comprising a housing having a transversely extending dividing wall, said wall having a central opening, a vertical apertured rear panel for supporting a film holder, a tunnel between the opening of the dividing wall and the aperture of the rear wall to form a light passage from the camera lens to a film in the film holder, a horizontal focusing screen in the housing above said opening, said housing having a top viewing opening above the screen, a manually operated shutter to close the viewing opening, a reflex shutter slidable upon the dividing wall having a central opening and a mirror on opposite sides of said opening, said central opening and one of the mirrors being adapted to traverse the central opening of the dividing wall with one of said mirrors coming to rest to normally cover said opening, and means for initiating the movement of the reflex shutter as the manually operated shutter is moved to close the top viewing opening, said reflex shutter being moved by electrical means, said electrical means being within a circuit and a switch means within said circuit adapted to close said circuit as the viewing opening is closed, said electrical means being a push-pull solenoid, and said circuit having in series with the circuit closing switch a reversing switch for selectively operating the solenoid to push or pull, said reversing switch being mechanically actuated in advance of the circuit closing switch.

3. A reflex viewing screen and shutter for a stereoscopic camera comprising an inclined dividing wall interposed between the lenses and the film, said wall having an aperture aligned with the axis of each lens, a shutter screen slidable upon said dividing wall, said shutter screen having two apertures adapted to be moved into and out of register with the apertures of the dividing wall to effect exposure of film frames and having three spaced reflecting areas, one area being between the apertures and one beyond each aperture, a viewing screen horizontally disposed above the dividing wall, a horizontal wall below the screen, said horizontal wall having apertures in register with the apertures of the inclined dividing wall, a horizontal shutter slidably mounted lengthwise of the horizontal wall and having two apertures adapted to be moved into and out of register with the apertures of the horizontal wall and opaque areas extending between the apertures and beyond said apertures to selectively cover said apertures, said horizontal shutter being adapted to be moved in one direction to first uncover the apertures of the horizontal wall to expose two of the reflecting areas and to be subsequently moved to cover said apertures.

4. A reflex viewing screen and shutter for a stereoscopic camera as claimed in claim 3, wherein the subsequent movement of the horizontal shutter is adapted to be in the same direction as the first named movement.

5. A reflex viewing screen and shutter for a stereoscopic camera as claimed in claim 3, wherein the shutter screen upon the inclined dividing wall is adapted to be moved subsequent to the second movement of the horizontal shutter.

6. A reflex viewing screen and shutter for a stereoscopic camera as claimed in claim 3, wherein the shutter screen upon the inclined dividing wall is adapted to be moved subsequent to the second movement of the horizontal shutter and is adapted to move the reflecting areas whereby one reflecting area is moved out of register with an aperture of the horizontal shutter and another of said areas is brought into register with one of said apertures.

References Cited in the file of this patent

UNITED STATES PATENTS

| 372,857 | Lewis | Nov. 8, 1887 |
| 451,027 | Cannon | Apr. 28, 1891 |
| 965,516 | Hall | July 26, 1910 |
| 1,124,313 | Pierman | Jan. 12, 1915 |
| 1,272,292 | Menns | July 9, 1918 |
| 1,808,274 | Webster | June 2, 1931 |
| 1,963,107 | Walters | June 19, 1934 |
| 1,991,311 | Barbieri | Feb. 12, 1935 |
| 2,234,345 | Hersberg | Mar. 11, 1941 |

FOREIGN PATENTS

| 293,921 | Switzerland | Jan. 4, 1954 |